United States Patent
Seo et al.

(10) Patent No.: US 12,420,354 B2
(45) Date of Patent: *Sep. 23, 2025

(54) ROTARY TOOL, JOINING DEVICE, AND JOINING METHOD

(71) Applicant: NIPPON LIGHT METAL COMPANY, LTD., Tokyo (JP)

(72) Inventors: Nobushiro Seo, Shizuoka (JP); Ryo Yoshida, Shizuoka (JP); Shingo Koizumi, Shizuoka (JP); Keita Oikawa, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 18/255,801

(22) PCT Filed: Nov. 1, 2021

(86) PCT No.: PCT/JP2021/040289
§ 371 (c)(1),
(2) Date: Jun. 2, 2023

(87) PCT Pub. No.: WO2022/118590
PCT Pub. Date: Jun. 9, 2022

(65) Prior Publication Data
US 2024/0001478 A1     Jan. 4, 2024

(30) Foreign Application Priority Data

Dec. 4, 2020   (JP) .................. 2020-201870

(51) Int. Cl.
B23K 20/12   (2006.01)
(52) U.S. Cl.
CPC ................. *B23K 20/125* (2013.01)

(58) Field of Classification Search
CPC .................................................... B23K 20/12
See application file for complete search history.

(56) References Cited

U.S. PATENT DOCUMENTS

| | | | |
|---|---|---|---|
| 5,718,366 A * | 2/1998 | Colligan | B23K 20/125 228/2.1 |
| 7,654,435 B2 * | 2/2010 | Kumagai | B23K 20/1265 228/2.1 |

(Continued)

FOREIGN PATENT DOCUMENTS

| CN | 103128436 A | 6/2013 |
|---|---|---|
| CN | 110315197 A | 10/2019 |

(Continued)

OTHER PUBLICATIONS

International Search Report and Written Opinion for PCT/JP2021/040289 (Jan. 18, 2022).

(Continued)

*Primary Examiner* — Devang R Patel
(74) *Attorney, Agent, or Firm* — Merchant & Gould P.C.

(57) ABSTRACT

A rotary tool includes: a main body having a fixed unit and a rotary shaft; a stirring pin rotatable and movable relative to an axial direction of the rotary shaft, and inserted into a joint member to perform friction stirring; and a shoulder that is arranged on the main body so as not to receive a rotary force from the main body but to be movable relative to the axial direction of the rotary shaft, and that presses the joint member while in contact with the joint member, wherein the stirring pin and the shoulder are mounted to form an assembly so as to be relatively movable and to move integrally in the axial direction of the rotary shaft, and the rotary tool further includes a first elastic member that biases the assembly toward a distal-end side of the stirring pin relative to the axial direction of the rotary shaft.

11 Claims, 6 Drawing Sheets

(56) References Cited

U.S. PATENT DOCUMENTS

| | | | |
|---|---|---|---|
| 7,909,225 B2 * | 3/2011 | Henneboehle | B23K 20/1245 |
| | | | 228/2.1 |
| 9,216,472 B2 * | 12/2015 | Sato | B23K 20/126 |
| 2008/0296350 A1 | 12/2008 | Henneboehle et al. | |
| 2013/0134206 A1 | 5/2013 | Roos et al. | |
| 2014/0069985 A1 | 3/2014 | Okada et al. | |
| 2018/0099349 A1 | 4/2018 | Packer et al. | |
| 2019/0299325 A1 | 10/2019 | Landmark | |

FOREIGN PATENT DOCUMENTS

| | | | | |
|---|---|---|---|---|
| DE | 102005030800 A1 * | 1/2007 | | B23K 20/1255 |
| JP | 2009-519135 A | 5/2009 | | |
| JP | 2011083799 A * | 4/2011 | | |
| JP | 2012-196681 A | 10/2012 | | |

OTHER PUBLICATIONS

Non-final rejection for Taiwanese Patent Application No. 110144375 (Aug. 3, 2022).
Final rejection for Taiwanese Patent Application No. 110144375 (Jan. 12, 2023).

* cited by examiner

ROTARY TOOL, JOINING DEVICE, AND JOINING METHOD

This application is a National Stage Application of PCT/JP2021/040289, filed Nov. 1, 2021, which claims benefit of priority to Japanese Application No. 2020-201870, filed Dec. 4, 2020, and which applications are incorporated herein by reference. To the extent appropriate, a claim of priority is made to each of the above disclosed applications.

TECHNICAL FIELD

The present invention relates to a rotary tool, a joining device, and a joining method used for friction stir welding.

BACKGROUND ART

As a joining device for performing friction stir welding, one that carries out load control and one that carries out position control have been known, in order to control the pushing amount of a rotary tool relative to a joint member. The load control is mainly used in a joining device using a robot (robot arm), while the position control is mainly used in a joining device using a machining center (MC).

For example, Patent Literature 1 discloses a joining device that carries out load control. The joining device of Patent Literature 1 controls the depth of press-fitting of a shoulder member or a pin member into a joint object, in order to obtain good joining quality with a suitable precision according to joining conditions. In order to control the press-fitting depth, the joining device controls the position of the pin member relative to the shoulder member based on a press-fitting reference point set by a press-fitting reference point setting unit. The joining device includes a pressure detection unit, a pressure reference point setting unit, a tool drive control unit, and the like to carry out the above control.

CITATION LIST

Patent Literature

Patent Literature 1: JP2012-196681A

SUMMARY OF INVENTION

Technical Problem

The joining device of Patent Literature 1 carries out the load control and thus is complex in structure and expensive. Therefore, the recent demand has been for a rotary tool that can be mounted to a relatively inexpensive MC intended only for position control and that can carry out load control.

In view of the above, it is an object of the present invention to provide a rotary tool, a joining device, and a joining method that can carry out load control while mounted to a machining center.

Solution to Problem

An aspect of the present invention is a rotary tool used in a joining device that performs friction stir welding of a joint member, the rotary tool including: a main body having a fixed unit attached and secured to the joining device, and a rotary shaft for transmitting a rotary force from the joining device: a stirring pin that is arranged on the main body so as to be rotatable by receiving the rotary force from the main body and to be movable relative to an axial direction of the rotary shaft, and that is inserted into the joint member to perform friction stirring on the joint member; and a shoulder that is formed separately from the stirring pin, that is arranged on the main body so as not to receive a rotary force from the main body but to be movable relative to the axial direction of the rotary shaft, and that presses the joint member while in contact with the joint member, wherein the stirring pin and the shoulder are mounted to form an assembly so as to be relatively movable and to move integrally in the axial direction of the rotary shaft, and the rotary tool further comprises a first elastic member that biases the assembly toward a distal-end side of the stirring pin relative to the axial direction of the rotary shaft.

Preferably, in the rotary tool of the present invention, the main body further includes a cylindrical holder attached to the rotary shaft and a slide shaft that is housed in a center portion of the holder so as to be slidable in the axial direction of the rotary shaft and that rotates synchronously with the holder, the assembly is provided at a distal end of the slide shaft, and the slide shaft is biased toward the distal-end side of the assembly via the first elastic member.

Preferably, in the rotary tool of the present invention, the first elastic member is arranged so as to surround a lower part of the slide shaft.

Preferably, in the rotary tool of the present invention, the first elastic member is housed inside the holder and arranged between a base end portion of the slide shaft and a portion of the holder on a side of the fixed unit.

Preferably, in the rotary tool of the present invention, a key groove elongated in the axial direction of the rotary shaft is formed on one of the holder and the slide shaft, and a key is formed on the other one of the holder and the slide shaft so as to extend in a direction intersecting with the axial direction of the rotary shaft and fit into the key groove, the key moves inside the key groove along the axial direction of the rotary shaft as the slide shaft moves in the axial direction of the rotary shaft, and the key and the key groove come into contact with each other in a circumferential direction as the holder rotates, and thus the holder and the slide shaft rotate synchronously.

Preferably, in the rotary tool of the present invention, a bearing is interposed between the shoulder and the stirring pin.

Preferably, the rotary tool of the present invention further includes a second elastic member that biases the shoulder toward the distal-end side of the stirring pin relative to the axial direction of the rotary shaft.

Preferably, the rotary tool of the present invention further includes a retainer that retains the shoulder in a non-rotating state.

Preferably, in the rotary tool of the present invention, the first elastic member is an elastic member that imparts elastic force by at least one selected from a solid spring, a fluid spring, magnetic force, and electromagnetic force.

A second aspect of the present invention is a joining device including the rotary tool according to any one of claims 1 to 9, the joining device including: a power unit that outputs the rotary force to be transmitted to the rotary shaft of the rotary tool; and a position controller that performs position control of the rotary tool by holding the fixed unit of the rotary tool, wherein friction stir welding is performed on the joint member by moving the rotary tool to be in a predetermined height position with respect to the joint member by the position controller and inserting the stirring pin into the joint member while pressing the shoulder against the joint member.

Preferably, the joining device of the present invention further includes a retainer that retains the shoulder in a non-rotating state.

A third aspect of the present invention is a joining method including: performing friction stir welding on the joint member by moving the rotary tool according to any one of claims 1 to 11 to be in a predetermined height position with respect to the joint member and inserting the rotating stirring pin into the joint member while pressing the shoulder against the joint member.

According to the joining device and the joining method of the present invention, as in the case of the rotary tool according to claim 1, a simulative load control can be performed and a good surface finish after friction stir welding can be obtained even if a machining center is used.

Advantageous Effects of Invention

The rotary tool, the joining device, and the joining method according to the present invention can carry out load control using an elastic member.

DESCRIPTION OF EMBODIMENTS

Hereinafter, embodiments of the present invention will be described with reference to the accompanying drawings. The present invention is not limited only to the following embodiments. Also, some or all of the constituent elements in the embodiments can be combined as appropriate. Further, because the drawings are for conceptually explaining the present invention, dimensions of the respective constituent elements expressed and ratios thereof may be different from actual ones.

[1. Rotary Tool]

Figure 1:
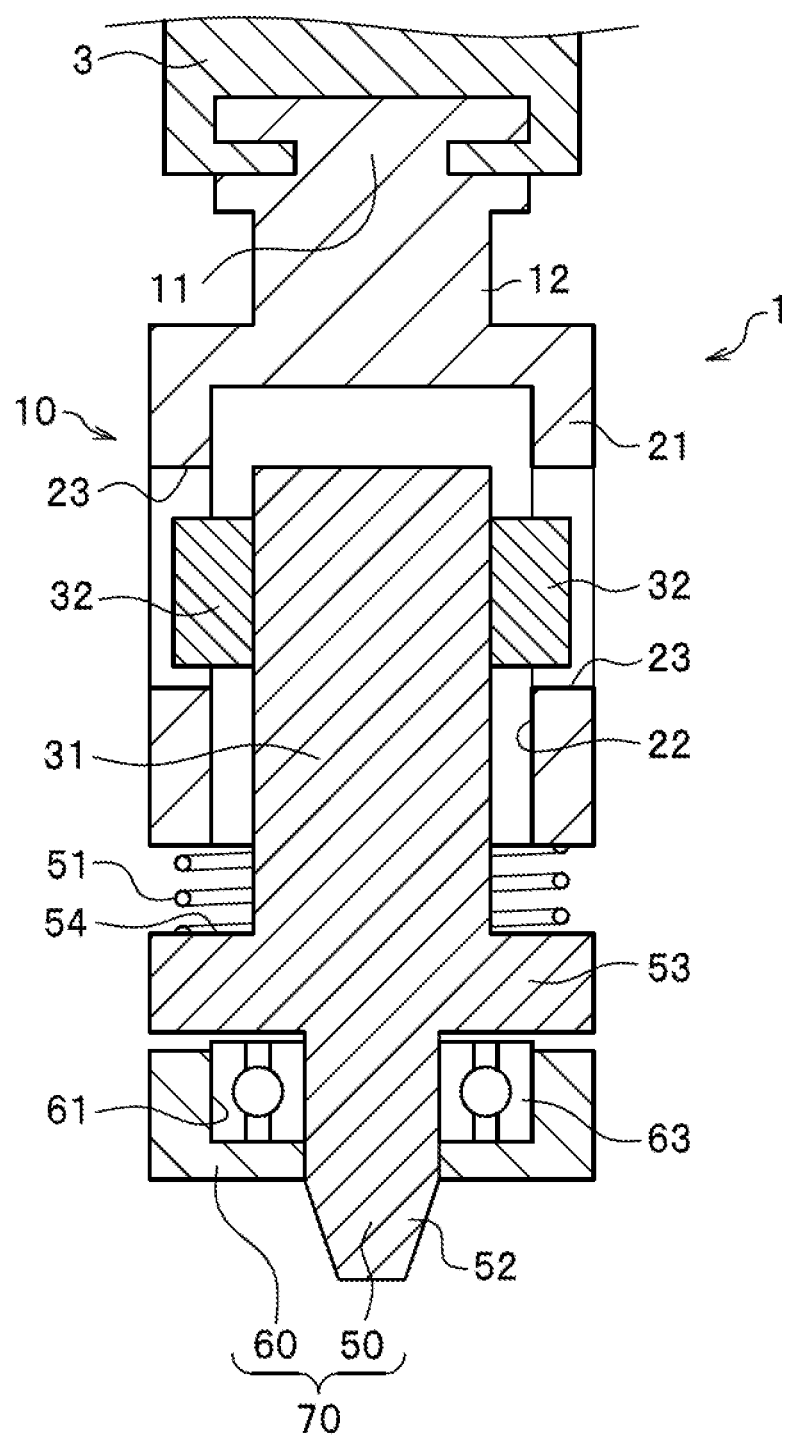
FIG. 1 is a cross-sectional view showing a rotary tool according to an embodiment of the present invention.

First, a configuration of a rotary tool according to this embodiment will be described. As shown in FIG. 1, a rotary tool 1 according to this embodiment is used in a joining device 3 (see FIG. 1) that performs friction stir welding of a joint member 2 (see FIG. 4), and is inserted into a butted part of the joint member 2 while rotating. The rotary tool 1 includes a main body 10, a stirring pin 50, a shoulder 60, and a first elastic member 51. The stirring pin 50 and the shoulder 60 are mounted to form an assembly 70 so as to be relatively movable and to move integrally in an axial direction of a rotary shaft. The rotary tool 1 also includes a retainer 80.

<Main Body>

The main body 10 is a part fixed to a joining device 3 such as a machining center, for example, and includes a fixed unit 11 and a rotary shaft 12. The fixed unit 11 is a part that is attached and secured to the joining device 3 and has a cylindrical shape. The fixed unit 11 is a chuck mechanism and can be detachably fixed to the joining device by cooperating with a chuck mechanism to be paired therewith, which is provided in the joining device 3. Examples of the chuck mechanism include grooves provided in the fixed unit 11 and claws provided in the joining device 3 that fit into the grooves on the fixed unit 11 to clamp the fixed unit 11. The rotary shaft 12 is connected to the other end side (lower side in FIG. 1) of the fixed unit 11 that is attached to the joining device 3. The rotary shaft 12 has a cylindrical shape. The rotary shaft 12 is a part that transmits a rotary force from the joining device 3 to the stirring pin 50, and is connected to a rotary shaft (not shown) of the joining device 3 via the fixed unit 11.

Figure 2:
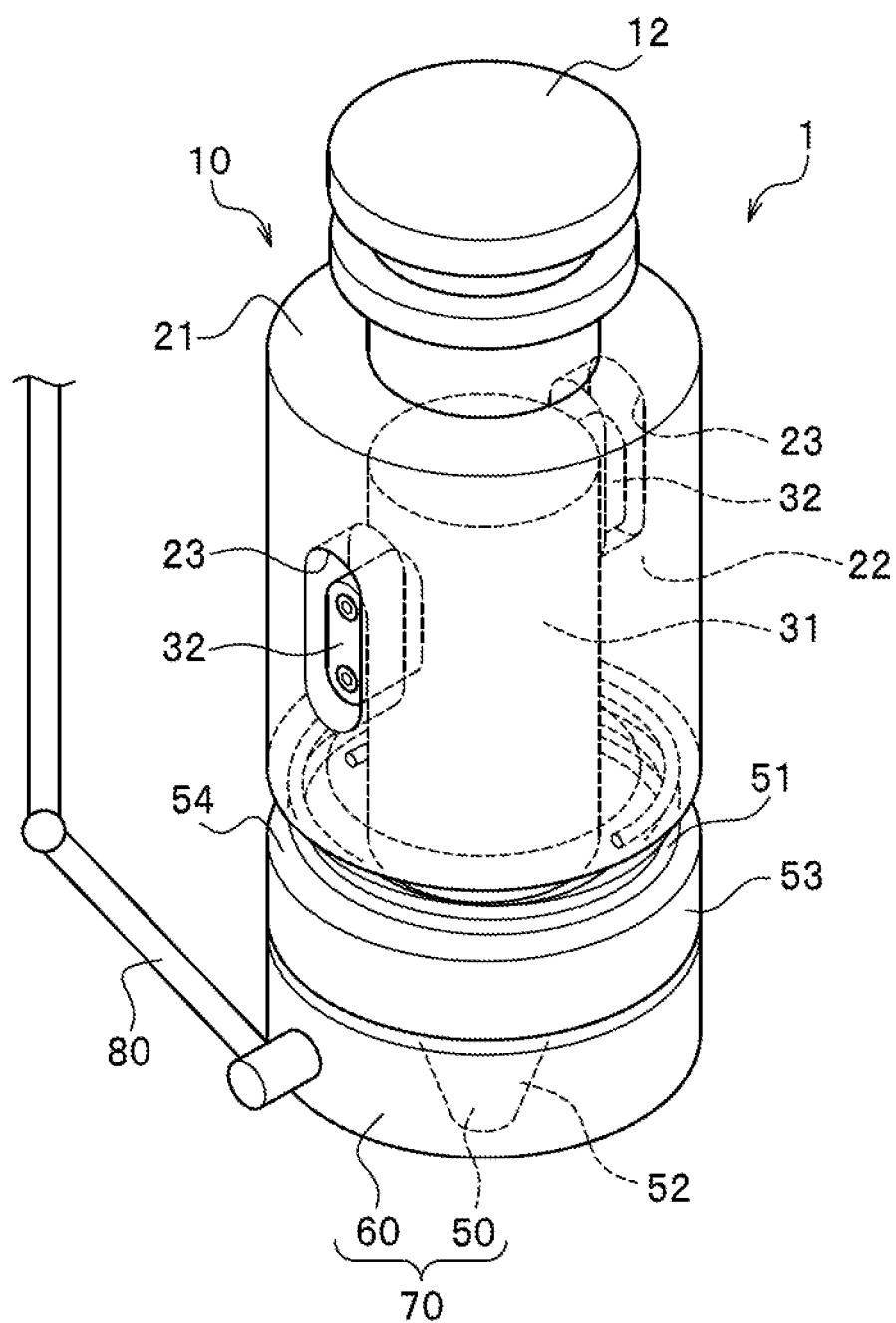
FIG. 2 is a perspective view showing the rotary tool according to the embodiment.
Figure 3:
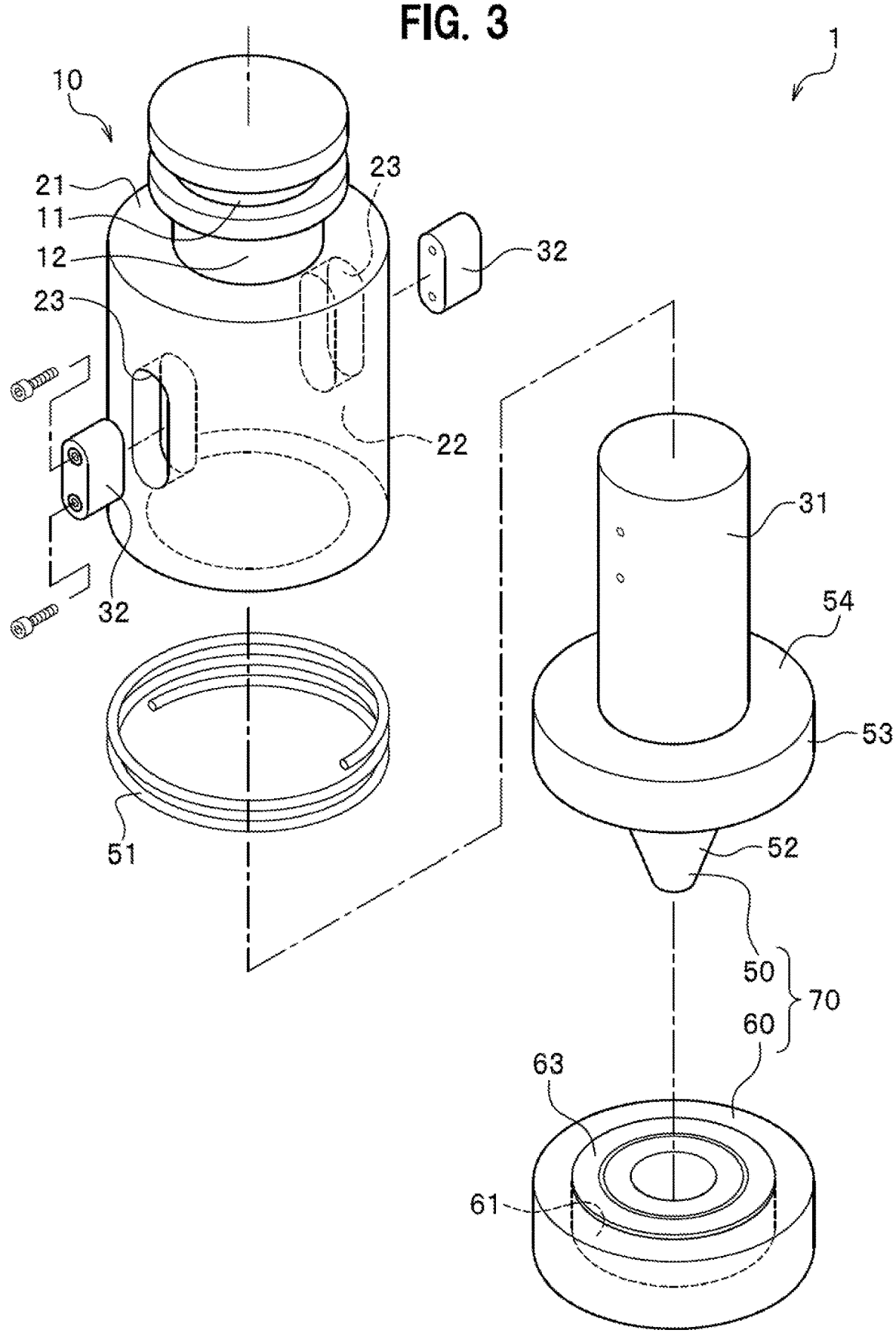
FIG. 3 is an exploded perspective view showing the rotary tool according to the embodiment.

As shown in FIGS. 2 and 3, the main body 10 further includes a holder 21 and a slide shaft 31.

<Holder>

The holder 21 is a part that is attached to the rotary shaft 12, rotates synchronously with the rotary shaft 12, and supports the slide shaft 31 and the stirring pin 50. The holder 21 has a bottomed cylindrical shape with a closed upper portion. The holder 21 has a housing recess 22 at a hollow portion formed therein, into which the slide shaft 31 is inserted. The housing recess 22 has a columnar shape and opens at both sides (upper and lower sides in FIG. 1) in the axial direction of the rotary shaft 12. A key groove 23 is formed in a cylinder barrel portion of the holder 21. The key groove 23 is formed in an oval shape that is elongated along an axial direction of the rotary shaft 12 (vertical direction in FIG. 1), and penetrates from the outer peripheral surface to the inner peripheral surface of the holder 21. The key groove 23 may not penetrate the cylinder barrel portion, and may be formed in the shape of a groove on the inner peripheral surface of the cylinder barrel portion. The key grooves 23 are arranged at 180° intervals in the circumferential direction of the cylinder barrel portion and are formed at two locations facing each other. The number of the key grooves 23 is not limited to two, and may be one or greater than or equal to three.

<Slide Shaft>

The slide shaft 31 is a part that is housed in the housing recess 22 at a center portion of the holder 21 so as to be slidable in the axial direction of the rotary shaft (vertical direction in FIG. 1) and that rotates synchronously (co-rotates) with the holder 21. The slide shaft 31 has a cylindrical shape and has an outside diameter that allows to be housed in the housing recess 22. A key 32 projecting outward is provided on the outer peripheral surface of the slide shaft 31. The key 32 is fixed at a position corresponding to the key groove 23 at the base end portion of the slide shaft 31 (end portion on a side of the rotary shaft 12: upper end portion in FIG. 1) and is inserted into the key groove 23. The key 32 has an oval shape that is long in the axial direction of the rotary shaft, has the same width as the key groove 23, and has a length shorter than that of the key groove 23 in the longitudinal direction. That is, the key 32 fits in the key groove 23 in the width direction and is movable in the longitudinal direction. Note that the shape of the key 32 is not limited to the oval shape but may be any other shape such as a circle, an ellipse, an oblong ellipse, and a rectangle as long as the shape has the same width as the key groove 23. The stirring pin 50 is integrally provided at the distal end portion of the slide shaft 31 (end portion on the side away from the joining device 3: lower end portion in FIG. 1). Therefore, the stirring pin 50 is biased toward the distal-end side by the first elastic member 51 and is thus biased toward the distal-end side of the slide shaft 31 (toward the side away from the joining device 3: lower side in FIG. 1).

<Stirring Pin>

The stirring pin 50 is a part that receives a rotary force from the main body 10 and is inserted into the joint member 2 while rotating to perform friction stirring on the joint member 2. The stirring pin 50 is made of, for example, tool steel and has a cylindrical shape. A distal end 52 (lower end portion in FIG. 1) of the stirring pin 50 tapers toward its tip. The tip of the distal end 52 of the stirring pin has a flat surface perpendicular to the axial direction. The stirring pin 50 has a flange portion 53 integrally formed at its base end portion, the flange portion having an enlarged diameter. The flange portion 53 is formed integrally with the slide shaft 31, and the stirring pin 50 and the flange portion 53 move in the axial direction of the rotary shaft as the slide shaft 31 slides. The flange portion 53 has a diameter larger than that of the slide shaft 31, and a ring-shaped step portion 54 in planar view is formed at the connection (base end portion of the flange portion 53) between the flange portion 53 and the slide shaft 31. The flange portion 53 functions as a receiver that receives the elastic force of the first elastic member 51 from the rear end side of the slide shaft 31 (the side near the joining device 3: upper side in FIG. 1). The flange portion 53 also functions as a support portion that supports the shoulder 60 provided on the distal-end side (lower side in FIG. 1) of the stirring pin 50.

<Shoulder>

The shoulder 60 is a part that presses the joint member while in contact with the joint member. The shoulder 60 is formed separately from the stirring pin 50 and is provided to be rotatable relative to the stirring pin 50 so as not to receive a rotary force from the main body 10. The shoulder 60 is not movable relative to the axial direction of the stirring pin 50 and the rotary shaft 12 and moves in the axial direction together with the stirring pin 50. That is, the shoulder 60 is axially movable with respect to the holder 21. To be more specific, the shoulder 60 is made of tool steel, for example. The shoulder 60 has a cylindrical shape and is coaxially arranged so as to surround the stirring pin 50. That is, the stirring pin 50 is inserted into a hollow portion 61 of the shoulder 60. The hollow portion 61 has its base end portion (upper end portion in FIG. 1) enlarged in diameter, and a bearing 63 interposed between the stirring pin 50 and the shoulder 60 is inserted thereinto. The bearing 63 is arranged so as to surround the stirring pin 50. Thus, the shoulder 60 is rotatable and not axially movable relative to the stirring pin 50.

The distal end face of the shoulder 60 is flush with the base end portion of the tapered surface of the distal end portion 52 of the stirring pin 50. That is, the distal end portion 52 of the stirring pin 50 protrudes from the distal end face of the shoulder 60 toward the distal-end side. The shoulder 60 moves in the axial direction of the rotary shaft 12 together with the stirring pin 50 connected integrally with the slide shaft 31 as the slide shaft 31 slides. As described above, the stirring pin 50 and the shoulder 60 are integrated into an assembly 70 that moves in the axial direction of the rotary shaft 12. That is, the assembly 70 is provided at the distal end of the slide shaft 31.

<First Elastic Member>

The first elastic member 51 is a part that biases the assembly 70 including the stirring pin 50 and the shoulder 60 toward the distal-end side with respect to the axial direction of the rotary shaft. The first elastic member 51 is made of a coil spring, for example, and is arranged so as to surround the outer peripheral surface of the lower part of the slide shaft 31. The first elastic member 51 is mounted between the flange portion 53 of the assembly 70 and the distal end of the holder 21. The first elastic member 51 can bias the assembly 70 toward the distal end side against the force received from the assembly 70.

The elasticity of the first elastic member 51 is set such that the stirring pin 50 is displaced and inserted within a predetermined range within the entire movable range of the stirring pin 50 by the first elastic member 51 (movable length of the key 32 in the key groove 23) when the stirring pin 50 is inserted with a predetermined pressing load into the joint member 2 made of at least one selected from aluminum, copper, magnesium, and an alloy thereof. For example, when the first elastic member 51 is a coil spring and the load applied to the first elastic member 51 is 100 kg to 5 t, the stirring pin 50 is set to be inserted into the joint member 2 in a state where the first elastic member 51 is deformed with the deflection amount within the range of 0 to 30% of the free length of the first elastic member 51 and is set such that the shoulder 60 presses the joint member 2. Thus, even when the height of the joint member 2 changes as the stirring pin 50 is pushed into the joint member 2 at a given height, the insertion amount of the stirring pin 50 is easily kept constant by deforming the first elastic member 51 according to the change in the joint member 2.

Note that the first elastic member 51 is not limited to the coil spring, but may be a metal spring such as a plate spring or disc spring, or a polymer elastic member (elastomer) such as rubber, polymer resin, or sponge-like resin. The first elastic member 51 may also be a fluid spring using air pressure, gas pressure, or hydraulic pressure, or a magnetic spring using magnetic force or electromagnetic force.

The first elastic member 51 may be set so as to satisfy the relationship between deformation and elasticity when the stirring pin 50 is inserted to a predetermined depth, taking into account joining conditions. Further, with the joining conditions taken into account, the first elastic member 51 may be set so as to satisfy the relationship between deformation and elasticity, which allows the shoulder 60 pressed against the joint member 2 to press the joint member 2 without being inserted into the joint member 2 while in contact with the joint member 2. The joining conditions that affect the setting of the first elastic member 51 include, for example, conditions of a joining member such as the material of the joint member 2 and the shape of the joint portion as well as joining conditions such as the insertion depth of the stirring pin 50, the shape of the rotary tool 1, a rotation speed, and a moving speed. The shoulder 60 may at least partially come into contact with the joint member 2, and there may be some space between the shoulder 60 and the joint member 2 depending on the relationship with the surface shape of the joint member 2. It is preferable that the shoulder 60 comes into contact with the joint member 2 without a gap so that the metal material overflowing during friction stir welding can be suppressed to prevent the generation of burrs. Although the shoulder 60 may be inserted into the joint member 2 to some extent, it is preferable that the shoulder 60 is not deeply inserted into the joint member 2 so as to prevent the formation of a dent due to the contact between the joint member 2 and the shoulder 60 after the joint.

<Retainer>

As shown in FIG. 2, the retainer 80 is a rod-shaped arm member and has its distal end secured to the outer peripheral surface of the shoulder 60. The retainer 80 has its base end portion connected to a fixing system of the joining device 3 so as to retain the shoulder 60 in a non-rotating state. This retainer 80 is included in the rotary tool 1. The shoulder 60 is provided so as to be rotatable relative to the rotary shaft 12, the holder 21, and the stirring pin 50, and are also retained in a non-rotating state by the retainer 80. Thus, even when the stirring pin 50 rotates, the shoulder 60 can be retained in the non-rotating state.

[2. Joining Device]

Next, a configuration of the joining device 3 including the rotary tool 1 having the configuration described above will be described. The joining device 3 includes: a power unit (not shown) that outputs a rotary force to be transmitted to the rotary shaft 12 of the rotary tool 1; and a position controller (not shown) that carries out position control of the rotary tool by holding the fixed unit 11 of the rotary tool 1. The joining device 3 includes a machining center that carries out position control, for example, and the position controller includes a CPU and the like to move the rotary tool 1 by operating the power unit based on position information inputted in advance. The power unit moves the rotary tool 1 in three axial directions of XYZ.

[3. Joining Method]

Next, a joining method according to the present invention will be described with reference to FIG. 4. In the joining method, friction stir welding is performed on the joint member 2 by moving the rotary tool 1 according to this embodiment to be in a preset predetermined height position with respect to the joint member 2, and inserting the stirring pin 50 of the rotary tool 1 in rotation into the joint member 2 while pressing the shoulder 60 of the rotary tool 1 against the joint member 2.

When inserting the stirring pin 50, the distal end of the stirring pin 50 first comes into contact with the joint member 2 as the rotary tool 1 approaches the joint member 2 in the insertion direction. When the rotary tool 1 further approaches the joint member 2, the first elastic member 51 is compressed, thereby inserting the stirring pin 50 into the joint member 2 while increasing the elastic force of the first elastic member 51 that biases the stirring pin 50 toward the joint member 2. When the rotary tool 1 approaches further toward the joint member 2, the shoulder 60 comes into contact with the joint member 2. As the first elastic member 51 is compressed, the shoulder 60 is pressed against the joint member while increasing the elastic force of the first elastic member 51 that biases the stirring pin 50 and the shoulder 60 toward the joint member 2. In this event, the first elastic member 51 is set such that the first elastic member 51 is not completely deformed and the stirring pin 50 can be inserted into the joint member 2 while the shoulder 60 can be pressed against the joint member 2 in a state where an excess force is left due to the deformation of the first elastic member 51. In addition, the first elastic member 51 is set so that the shoulder 60 can press the joint member 2 without being inserted into the joint member 2 while in contact with the joint member 2.

Figure 4:
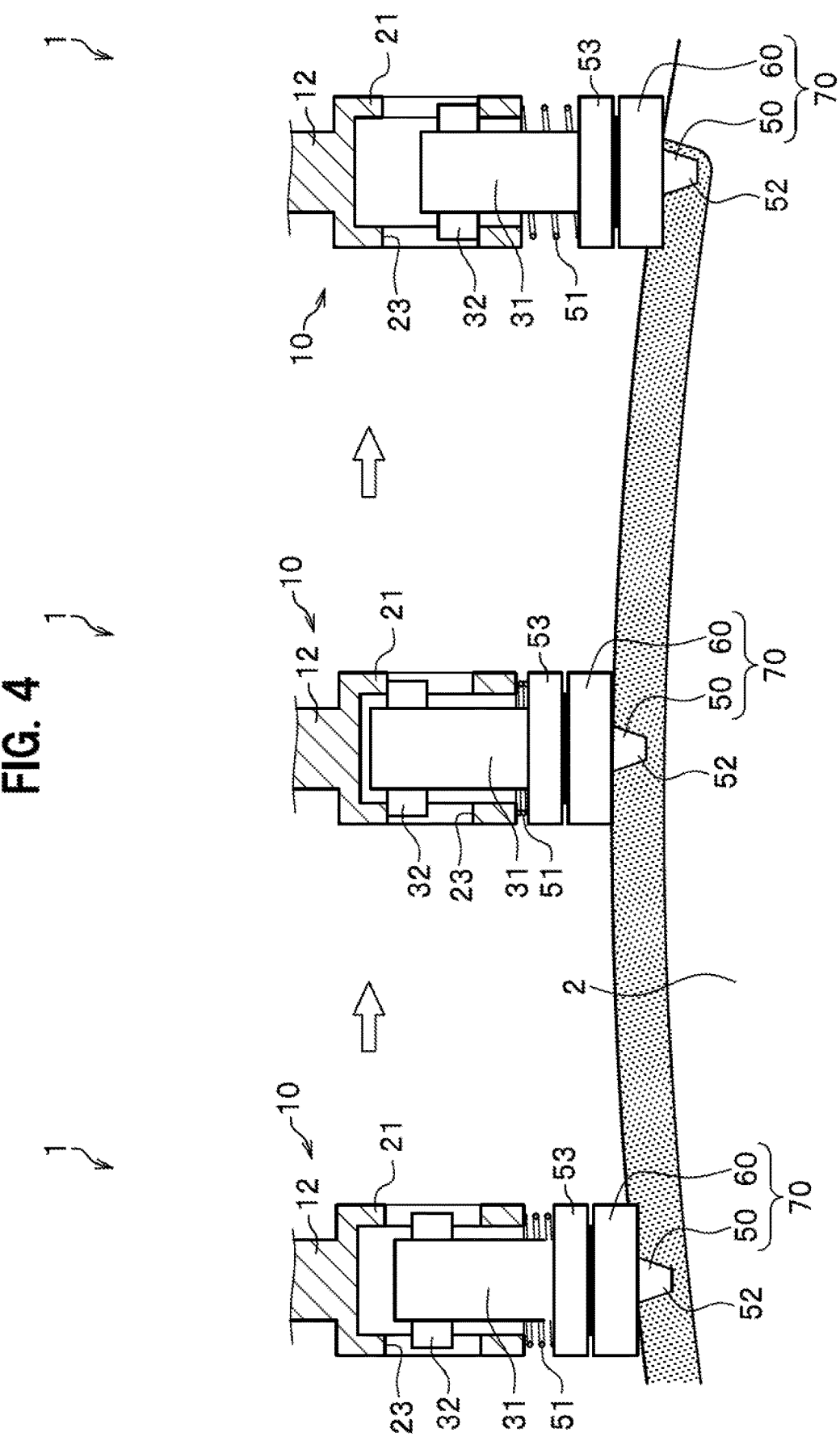
FIG. 4 is a cross-sectional view showing an operation of each part of the rotary tool according to the embodiment during friction stir welding.

During joining with the rotary tool 1, as shown in the left part of FIG. 4, the assembly 70 equipped with the stirring pin 50 and the shoulder 60 is biased toward the distal end by the first elastic member 51. Thus, when there is no error in the height of the joint member 2 with respect to the set value, as shown in the left part of FIG. 4, the distal end portion 52 of the stirring pin 50 is inserted into the joint member 2 to a desired depth. The shoulder 60 can press the joint member 2 without being inserted into the joint member 2 while in contact with the joint member 2.

Next, as shown in the center of FIG. 4, description is given of a case where the height of the joint member 2 is slightly higher than the set value due to an error during the friction stir welding. Here, if there is no first elastic member 51 and the stirring pin 50 is pushed directly into the joint member 2, the insertion amount of the stirring pin 50 and the shoulder 60 increases with an increase in the height of the joint member 2, as compared with the case where there is no error in the height of the joint member 2 with respect to the set value. On the other hand, when joining is performed with the rotary tool 1 according to this embodiment, as the height of the joint member 2 is increased, the assembly 70 including the stirring pin 50 is pushed up by an upward reaction force received from the joint member 2. At the same time, the first elastic member 51 is compressed by this push-up, and the assembly 70 is pushed down by a downward elastic force received from the first elastic member 51. The position of the stirring pin 50 and the shoulder 60 is changed to a position where the upward reaction force and the downward elastic force caused by such a change in height of the joint member 2 are balanced. The first elastic member 51 is set so that the insertion amount of the stirring pin 50 and the shoulder 60 in this event is approximately the same as the insertion amount when there is no error in the height of the joint member 2 with respect to the set value. If the elastic force of the first elastic member 51 is too weak, the upward reaction force due to the change in height of the joint member 2 increases, resulting in a reduction in the insertion amount. On the other hand, if the elastic force of the first elastic member 51 is too strong, the downward elastic force due to the change in height of the joint member 2 increases, resulting in an increase in the insertion amount. More specifically, even when the height of the joint member 2 changes and increases, the first elastic member 51 is set in the rotary tool 1 so that the stirring pin 50 is inserted into the joint member 2 to a desired depth set in accordance with the set value of the height of the joint member 2. More specifically, the first elastic member 51 is set in the rotary tool 1 so that, even when the height of the joint member 2 changes and increases, the shoulder 60 presses the joint member 2 without being inserted into the joint member 2 while in contact with the joint member 2.

When the height of the joint member 2 becomes lower than the set value, as shown in the right part of FIG. 4, the first elastic member 51 stretches and the assembly 70 including the stirring pin 50 descends. Thus, even when the height of the joint member 2 changes and becomes lower, the first elastic member 51 is set in the rotary tool 1 so that the stirring pin 50) is inserted into the joint member 2 to a desired depth set in accordance with the set value of the height of the joint member 2. Moreover, even when the height of the joint member 2 changes and becomes lower, the first elastic member 51 is set in the rotary tool 1 so that the shoulder 60 presses the joint member 2 without being inserted into the joint member 2 while in contact with the joint member 2.

Then, at a position for pulling out the stirring pin 50, the shoulder 60 is first separated from the joint member 2 as the rotary tool 1 is moved away from the joint member 2. As the rotary tool 1 is moved further away from the joint member 2, the insertion amount of the stirring pin 50 is gradually reduced. When the rotary tool 1 is moved even further away from the joint member 2, the stirring pin 50 is separated from the joint member 2.

As described above, in the rotary tool 1, the stirring pin 50 is inserted into the joint member 2 to a certain depth by the action of the first elastic member 51. Thus, a plasticized region is formed at a certain depth. Therefore, stable joining quality can be achieved. Further, in the rotary tool 1, the friction stirring is performed by inserting the stirring pin 50 into the joint member 2 while maintaining the state where the shoulder 60 presses the joint member 2 by the action of the first elastic member 51. Thus, the shoulder 60 can press the metal material overflowing from the insertion site of the stirring pin 50 due to the friction stirring with the stirring pin 50. Therefore, the generation of burrs can be reduced.

[4. Advantageous Effects]

According to the rotary tool 1, the joining device 3, and the joining method according to this embodiment, the assembly 70 provided so as to be movable in the axial direction of the rotary shaft 12 is biased toward the distal-end side by the first elastic member 51, and thus the stirring pin 50 is inserted to a predetermined depth according to the elasticity of the first elastic member 51 when the distal end portion 52 of the stirring pin 50 is inserted into the joint member 2. Further, the assembly 70 is biased toward the distal end by the first elastic member 51, and thus the shoulder 60 can be pressed against the joint member 2 according to the elasticity of the first elastic member 51. By setting the first elastic member 51 in consideration of the joining conditions such as the joining member and joining mode, the stirring pin 50 can be inserted to a desired depth and the joint member 2 can be pressed by the shoulder 60. More specifically, the rotary tool 1 can perform simulative load control using the first elastic member 51.

When a rotary tool having no elastic member is attached to a joining device such as a machining center, for example, that can only perform position control, a support height of the rotary tool 1 is kept constant based on a value set by the machining center, and the insertion position of the stirring pin 50 is kept approximately constant. On the other hand, when the rotary tool 1 according to this embodiment is used, even when the support height of the rotary tool 1 by the machining center is constant, the first elastic member 51 stretches according to the height of the joint member 2 and the assembly 70 moves in the axial direction. Thus, by utilizing the elasticity of the first elastic member 51, the load control can be performed by controlling the insertion depth of the stirring pin 50 into the joint member 2 as well as by controlling the mode of contact to the joint member 2 using the shoulder 60.

The rotary tool 1 includes the shoulder 60 that is arranged so as to be movable independently of the stirring pin 50 with respect to the axial direction of the rotary shaft 12 without receiving a rotary force from the rotary shaft 12, and presses the joint member 2. The generation of burrs can be reduced by the shoulder 60 pressing the metal material overflowing from the insertion site of the stirring pin 50 due to friction stirring with the stirring pin 50. Thus, the shoulder 60 provides a good surface finish after friction stir welding.

The main body 10 further includes the cylindrical holder 21 and the slide shaft 31 that is housed in the center portion of the holder 21 so as to be slidable in the axial direction of the rotary shaft and that rotates synchronously with the holder 21. The assembly 70 is provided at the distal end of the slide shaft 31. Thus, the assembly 70 can slide in the axial direction of the rotary shaft while transmitting the rotary force from the main body 10 to the assembly 70.

In the rotary tool 1, the first elastic member 51 is arranged so as to surround the lower part of the slide shaft 31. Thus, the first elastic member 51 is positioned near the intermediate portion between the slide shaft 31 and the stirring pin 50, and the first elastic member 51 acts on the slide shaft 31 evenly in the circumferential direction. Therefore, even when the slide shaft 31 moves, the first elastic member 51 stably biases the stirring pin 50 toward the distal-end side. Accordingly, the first elastic member 51 can be easily provided, and the precision of the load control of the stirring pin 50 can be improved.

In the rotary tool 1, the first elastic member 51 is housed in the holder 21 and arranged between the base end portion of the slide shaft 31 and a portion of the holder 21 on a side of the fixed unit. Thus, the first elastic member 51 is positioned near the intermediate portion between the slide shaft 31 and the stirring pin 50, and the holder 21 can receive the force that the first elastic member 51 receives from the stirring pin 50. Therefore, even when the slide shaft 31 moves, the first elastic member 51 stably biases the stirring pin 50 toward the distal-end side. Thus, the precision of the load control of the stirring pin 50 can be improved.

The key groove 23 is formed in the holder 21 and the key 32 is formed on the slide shaft 31. Thus, the slide shaft 31 and the assembly 70 rotate synchronously with the rotation of the holder 21, and allow axial movement in a stable state. Therefore, the operation of the stirring pin 50 and the shoulder 60 can be further stabilized.

The bearing 63 is interposed between the shoulder 60 and the stirring pin 50. Thus, the shoulder 60 and the stirring pin 50 can stably rotate relative to each other.

The rotary tool 1 includes the retainer 80 that retains the shoulder 60 in a non-rotating state. Thus, the shoulder 60 can be more easily retained in the non-rotating state, and the surface finish of the joint member 2 is further improved after the friction stir welding.

In the rotary tool 1, the first elastic member 51 is preferably an elastic member that imparts elastic force by at least one selected from a solid spring, a fluid spring, magnetic force, and electromagnetic force. Such a configuration makes it easier to adjust the elasticity of the first elastic member 51.

The joining device 3 includes the rotary tool 1, the power unit, and the position controller. The joining device 3 performs the friction stir welding of the joint member 2 with the position controller by moving the rotary tool 1 to be in a predetermined height position with respect to the joint member 2 and inserting the stirring pin 50 into the joint member 2 while pressing the shoulder 60 against the joint member 2. According to the joining device 3, by utilizing the elasticity of the first elastic member 51, the friction stir welding can be performed while performing load control for controlling the insertion depth of the stirring pin 50 into the joint member 2 as well as for controlling the contact of the shoulder 60 to the joint member 2. In addition, the shoulder 60 presses the metal material overflowing from the insertion site of the stirring pin 50 due to the friction stirring with the stirring pin 50, thereby reducing the generation of burrs and improving the surface finish after the friction stir welding. Thus, a simulative load control can be performed and a good surface finish after friction stir welding can be obtained even if a machining center is used.

In the joining method described above, the friction stir welding of the joint member 2 is performed by moving the rotary tool 1 to be in a predetermined height position with respect to the joint member 2, and inserting the stirring pin 50 in rotation into the joint member 2 while pressing the shoulder 60 against the joint member 2. According to the joining method, by utilizing the elasticity of the first elastic member 51, the friction stir welding can be performed while performing load control for controlling the insertion depth of the stirring pin 50 into the joint member 2 as well as for controlling the contact of the shoulder 60 to the joint member 2. In addition, the shoulder 60 presses the metal material overflowing from the insertion site of the stirring pin 50 due to the friction stirring with the stirring pin 50, thereby reducing the generation of burrs and improving the surface finish after the friction stir welding.

As described above, according to the rotary tool 1, the joining device 3, and the joining method, the load control can be performed even when mounted to the machining center that performs position control only.

[5. First Modified Example]

Figure 5:
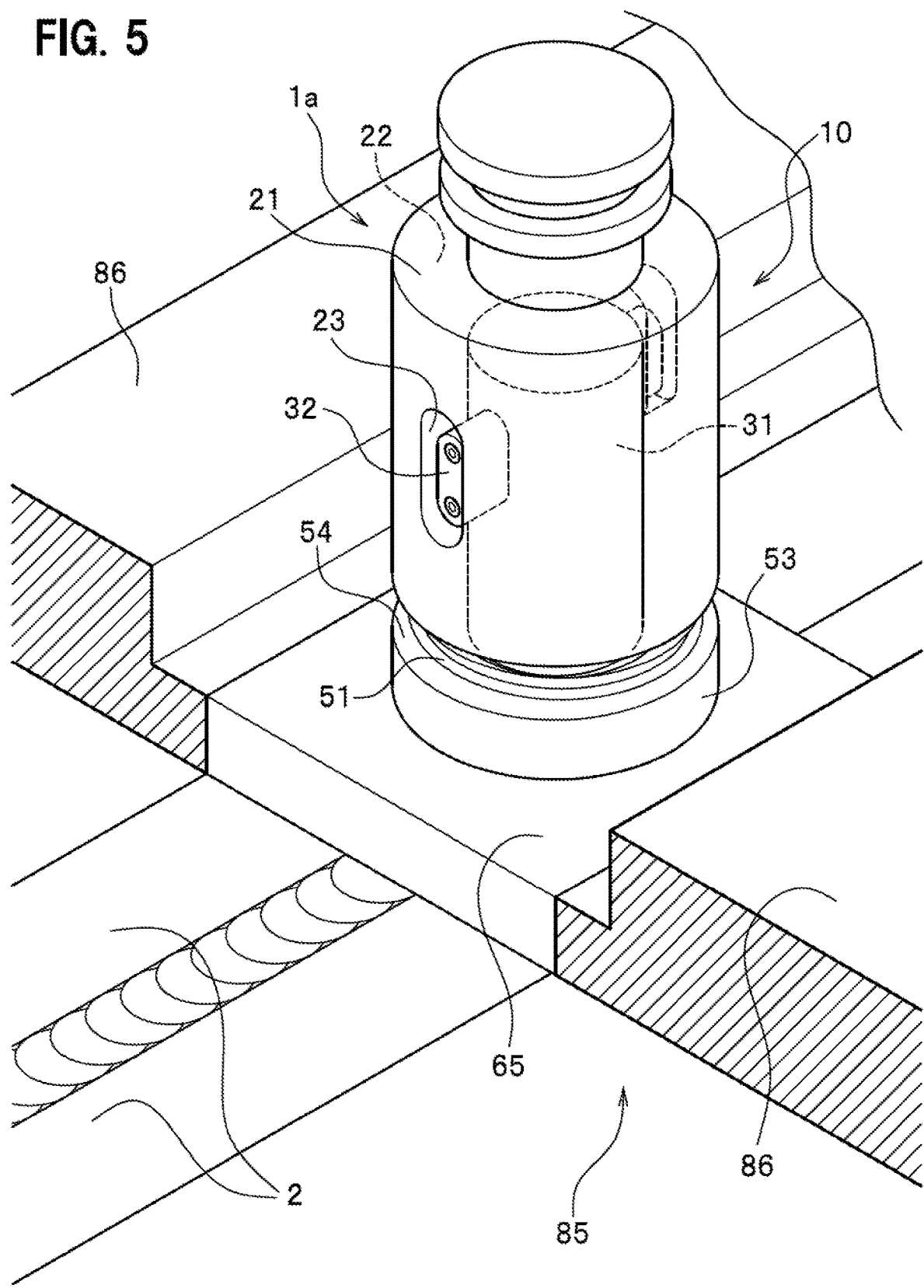
FIG. 5 is a perspective view showing a modified example of a retainer of the rotary tool according to the embodiment.

Next, a modified example of the retainer will be described with reference to FIG. 5. As shown in FIG. 5, a retainer 85 according to the modified example has a configuration in which a shoulder 65 provided below a flange portion 53 has a rectangular outer shape and guide members 86 are provided along the movement locus of a rotary tool 1a. The guide members 86 are made of long members, and are arranged on both sides of the shoulder 65 with a space substantially the same as the width of the shoulder 65 so as to sandwich the shoulder 65 from both sides. The guide members 86 are a retainer included in a joining device 3. The shoulder 65 configured as described above moves along the movement locus without rotating while having its outer peripheral surface slide on the side surfaces of the guide members 86. Inside the shoulder 65, a stirring pin 50 and a bearing 63 are inserted as in the case of the shoulder 60 shown in FIG. 1. Other configurations are the same as those of the rotary tool 1 shown in FIG. 1, and thus are denoted by the same reference numerals and description thereof will be omitted.

[6. Second Modified Example]

Figure 6:
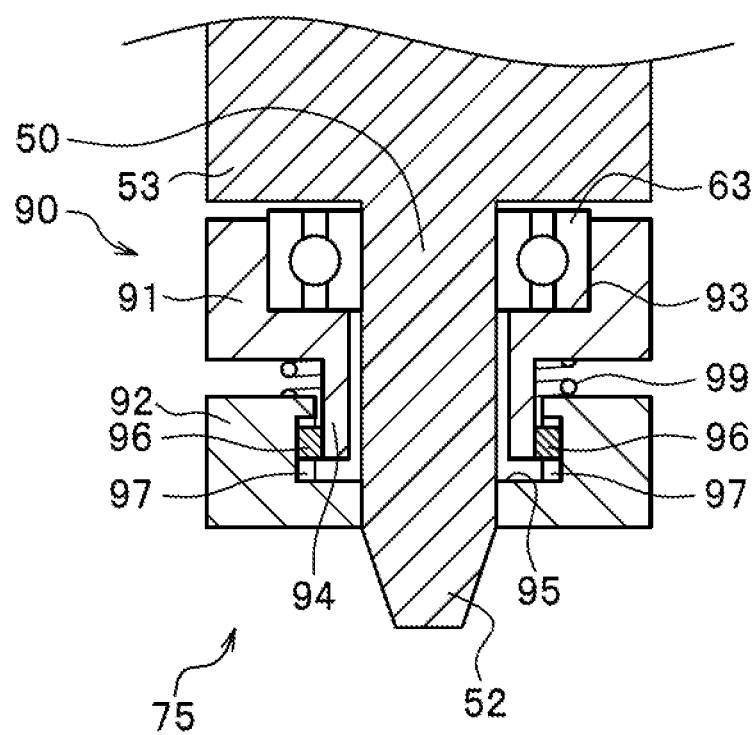
FIG. 6 is a cross-sectional view showing a modified example of a shoulder of the rotary tool according to the embodiment.

Next, a modified example of the shoulder will be described with reference to FIG. 6. In the above embodiment, the lower end surface of the shoulder 60 is not movable in the axial direction of the rotary shaft with respect to the stirring pin 50. On the other hand, as shown in FIG. 6, a shoulder 90 according to the modified example is configured such that a lower end surface of the shoulder is movable in the axial direction. To be more specific, the shoulder 90 includes a first member 91, a second member 92, and a second elastic member 99. The stirring pin 50 and the shoulder 90 are integrated into an assembly 75 that moves in the axial direction of the rotary shaft 12.

The first member 91 is a part that is provided to be rotatable relative to the stirring pin 50, and is made of tool steel, for example. The first member 91 has a cylindrical shape and is coaxially arranged so as to surround the stirring pin 50. The stirring pin 50 is inserted into a hollow portion 93 of the first member 91. The hollow portion 93 has its base end portion (upper end portion in FIG. 5) enlarged in diameter, and a bearing 63 interposed between the stirring pin 50 and the first member 91 is inserted thereinto. The bearing 63 is arranged so as to surround the stirring pin 50. Thus, the first member 91 is rotatable and not axially movable relative to the stirring pin 50.

A protrusion 94 that protrudes from the end face of the first member 91 toward the distal-end side is formed at the distal end portion (lower end portion in FIG. 6) of the first member 91. The protrusion 94 has a cylindrical shape, and the stirring pin 50 is inserted thereinto. The protrusion 94 is a member for connecting the second member 92. A key 96 that protrudes outward from the outer peripheral surface is provided at the distal end portion of the protrusion 94. The key 96 is inserted into a key groove 97 of the second member 92 to be described later. The key 96 has an oval shape that is long in the axial direction of the rotary shaft, and the keys are radially arranged at 180° intervals in the circumferential direction at two locations. Note that the shape of the key 96 is not limited to the oval shape but may be any other shape such as a circle, an ellipse, an oblong ellipse, and a rectangle as long as the shape has the same width as the key groove 97.

The second member 92 is a part that presses the joint member while in contact with the joint member. The second member 92 is a part that is attached to the protrusion 94, rotates synchronously with the first member 91, and is movable in the axial direction of the rotary shaft 12 relative to the first member 91. The second member 92 is made of tool steel, for example. The second member 92 has a cylindrical shape and is coaxially arranged so as to surround the stirring pin 50. The stirring pin 50 is inserted into a hollow portion 95 of the second member 92. The hollow portion 95 has its base end portion (upper end portion in FIG. 6) enlarged in diameter, and the distal end of the protrusion 94 is inserted thereinto. The key groove 97 is formed in the base end portion of the hollow portion 95. The key groove 97 is formed in an oval shape that is elongated along the axial direction of the rotary shaft 12 (vertical direction in FIG. 6), and formed in the shape of a groove on the inner peripheral surface of the hollow portion 95. The key grooves 97 are formed at two locations corresponding to the positions of the keys 96 of the protrusion 94. The axial length of the key groove 97 is longer than the axial length of the key 96, and the second member 92 is movable in the axial direction with respect to the first member 91. The width of the key groove 97 is the same as the width of the key 96, and the second member 92 is not rotatable relative to the first member 91. When the key 96 is located at the base end portion of the key groove 97, the distal end face of the second member 92 is flush with the base end portion of the tapered surface of the distal end portion 52 of the stirring pin 50. That is, the distal end portion 52 of the stirring pin 50 protrudes from the distal end face of the second member 92 toward the distal-end side. The axial length of the shoulder 90 is shortened by moving the second member 92 from the above-described position toward the first member 91.

The second elastic member 99 is a part that biases the second member 92 that is part of the shoulder 90 toward the distal-end side of the stirring pin 50 in the axial direction of the rotary shaft 12. The second elastic member 99 is made of a coil spring, for example, and is arranged so as to surround the outer peripheral surface of the protrusion 94. The second elastic member 99 is mounted between the distal end surface (surface connecting to the base end portion of the protrusion 94) of the first member 91 and the base end surface of the second member 92. The second elastic member 99 can bias the second member 92 toward the distal-end side against the force received from the second member 92.

The elasticity of the second elastic member 99 is set such that the second member 92 is displaced to press the joint member 2 within a predetermined range of the entire movable range of the second member 92 by the elastic member (movable length of the key 96 in the key groove 97) when the stirring pin 50 is inserted with a predetermined pressing load into the joint member made of at least one selected from aluminum, copper, magnesium, and an alloy thereof. For example, when the second elastic member 99 is a coil spring and the load applied to the second elastic member 99 is 50 kg to 2 t, the second member 92 is set to press the joint member 2 in a state where the second elastic member 99 is deformed with the deflection amount within the range of 0 to 30% of the free length of the second elastic member 99. Thus, the joint member 2 is easily pressed by the second member 92 without the second member 92 being inserted into the joint member 2 in a state where the second member 92 is in contact with the joint member 2. The second elastic member 99 deforms more easily than the first elastic member 51.

Note that the second elastic member 99 is not limited to the coil spring, as in the case of the first elastic member 51, but may be a metal spring such as a plate spring or disc spring, or a polymer elastic member (elastomer) such as rubber, polymer resin, or sponge-like resin. The second elastic member 99 may also be a fluid spring using air pressure, gas pressure, or hydraulic pressure, or a magnetic spring using magnetic force or electromagnetic force.

With the joining conditions taken into account, the second elastic member 99 may be set so as to satisfy the relationship between deformation and elasticity, which allows the shoulder 60 pressed against the joint member 2 to press the joint member 2 without being inserted into the joint member 2 while in contact with the joint member 2. The joining conditions that affect the setting of the second elastic member 99 include, for example, the conditions of the joining member such as the material of the joint member 2 and the shape of the joint portion as well as joining conditions such as the insertion depth of the stirring pin 50, the shape of the rotary tool 1, the rotation speed, and the moving speed. The shoulder 60 may at least partially come into contact with the joint member 2, and there may be some space between the shoulder 60 and the joint member 2 depending on the relationship with the surface shape of the joint member 2. It is preferable that the shoulder 60 comes into contact with the joint member 2 without a gap so that the metal material overflowing during friction stir welding can be pressed down to prevent the generation of burrs. Although the shoulder 60 may be inserted into the joint member 2 to some extent, it is preferable that the shoulder 60 is not deeply inserted into the joint member 2 so as to prevent the formation of a dent due to the contact between the joint member 2 and the shoulder 60 after the joint.

Such a configuration enables relative movement between the distal end face of the shoulder 90 and the stirring pin 50, and allows the second elastic member 99 to perform load control of the shoulder 90. Therefore, the precision of the load control of the shoulder 90 can be further improved. Further, the shoulder 90 according to this modified example may have a retainer (not shown) secured to the outer peripheral surface of the first member 91. This retainer may retain the shoulder 90 and the second member 92 in a non-rotating state.

[7. Others]

Although embodiments of the present invention have been described above, the design can be changed as appropriate within the scope of the gist of the present invention. In the above embodiment, the key groove 23 is formed in the holder 21 and the key 32 is formed in the slide shaft 31, but the present invention is not limited thereto. A key may be formed on the holder 21 and a key groove may be formed in the slide shaft 31.

Further, in the above embodiment, the rotary tool 1 includes the retainer 80 fixed to the shoulder 60, and the retainer is connected to the joining device to retain the shoulder 60 in a non-rotating state. However, the present invention is not limited thereto. The joining device 3 may include a rod-shaped arm member fixed to the fixing system of the joining device 3 as a second retainer, and this second retainer may be connected to the shoulder 60 of the rotary tool 1 to retain the shoulder 60 in the non-rotating state. The second retainer is included in the joining device 3. Alternatively, the rotary tool 1 may include a rod-shaped arm member fixed to the shoulder 60 as the retainer 80, the joining device 3 may include a rod-shaped arm member fixed to the fixing system of the joining device 3 as the second retainer, and the both retainers may be connected to each other to retain the shoulder 60 in the non-rotating state. These retainers are included in the rotary tool 1 and the joining device 3, respectively. Thus, the retainer included in the rotary tool 1 and the second retainer that is included in the joining device 3 and operates in cooperation with the retainer included in the rotary tool 1 may be provided at the same time. As described above, since the joining device 3 includes the second retainer that retains the shoulder 60 in the non-rotating state, the shoulder 60 can be easily retained in the non-rotating state. Thus, the surface finish of the joint member 2 is further improved after the friction stir welding.

Further, in the above embodiment, the first elastic member 51 is arranged so as to surround the lower part of the slide shaft 31 and is provided between the lower end of the holder 21 and the step portion 54 of the flange portion 53. However, the present invention is not limited thereto. The first elastic member 51 may be arranged at any position as long as the first elastic member biases the assembly 70 toward the distal-end side. For example, the first elastic member may be housed in the holder 21 and mounted between the base end portion of the slide shaft and the bottom portion of the holder. At the upper end portion of the slide shaft 31, a columnar extension portion is formed, which extends toward the upper end portion. The first elastic member 51 may be mounted so as to surround the extension portion of the slide shaft 31 between the slide shaft and a portion of the holder 21 on a side of the fixed unit. In this event, the extension portion may be formed to have a diameter smaller than that of the slide shaft 31 according to the inside diameter of the holder 21. In such a case, the same effects as those of the above-described embodiment can also be achieved.

In the second modified example, the distal end 52 of the stirring pin 50 protrudes downward from the bottom surface of the second member 92. However, the present invention is not limited thereto. In the rotary tool 1, the bottom surface of the second member 92 may protrude below the distal end 52 of the stirring pin 50 while not in contact with the joint member 2. As a result, when the rotary tool 1 is pulled out of the joint member 2, the stirring pin 50 is separated from the joint member 2 before the second member 92 in a state where the second member 92 is pressing the joint member 2 as the rotary tool 1 is moved away from the joint member 2. In this event, by pulling out the stirring pin 50 while maintaining the state where the second member 92 presses the joint member 2, the second member 92 can hold down the metal material overflowing due to the insertion of the stirring pin 50. Therefore, the metal material held down by the second member 92 can be easily filled in a hole created when the stirring pin 50 is pulled out. Particularly, when spot friction stirring is performed where the rotary tool 1 is inserted and pulled out without being moved from the insertion position during friction stir welding, the formation of a hole can be easily prevented.

REFERENCE SIGNS LIST 1 rotary tool
2 joint member
3 joining device
10 main body
11 fixed unit
12 rotary shaft
21 holder
23 key groove 31 slide shaft
32 key
50 stirring pin
51 first elastic member
60 shoulder
61 hollow portion
63 bearing
65 shoulder
70 assembly
80, 85 retainer
90 shoulder
99 second elastic member

The invention claimed is:

1. A rotary tool used in a joining device that performs friction stir welding of a joint member, the rotary tool comprising:
   a main body having a fixed unit attached and secured to the joining device, and a rotary shaft for transmitting a rotary force from the joining device, and the main body further including a holder having a cylindrical shape attached to the rotary shaft and a slide shaft that is housed in a center portion of the holder so as to be slidable in the axial direction of the rotary shaft and that rotates synchronously with the holder;
   a stirring pin that is arranged on the main body so as to be rotatable by receiving the rotary force from the main body and to be movable relative to an axial direction of the rotary shaft, and that is inserted into the joint member to perform friction stirring on the joint member; and
   a shoulder that is formed separately from the stirring pin, that is arranged on the main body so as not to receive a rotary force from the main body but to be movable relative to the axial direction of the rotary shaft, and that presses the joint member while in contact with the joint member, wherein
   the stirring pin and the shoulder are mounted to form an assembly so as to be relatively movable and to move integrally in the axial direction of the rotary shaft, and wherein the assembly is provided at a distal end of the slide shaft, and
   the rotary tool further comprises a first elastic member that biases the assembly toward a distal-end side of the stirring pin relative to the axial direction of the rotary shaft and the slide shaft is biased toward the distal-end side of the assembly via the first elastic member.

2. The rotary tool according to claim 1, wherein the first elastic member is arranged so as to surround a lower part of the slide shaft.

3. The rotary tool according to claim 1, wherein the first elastic member is housed inside the holder and arranged between a base end portion of the slide shaft and a portion of the holder on a side of the fixed unit.

4. The rotary tool according to claim 1, wherein
   a key groove elongated in the axial direction of the rotary shaft is formed on one of the holder and the slide shaft, and a key is formed on the other one of the holder and the slide shaft so as to extend in a direction intersecting with the axial direction of the rotary shaft and fit into the key groove,
   the key moves inside the key groove along the axial direction of the rotary shaft as the slide shaft moves in the axial direction of the rotary shaft, and
   the key and the key groove come into contact with each other in a circumferential direction as the holder rotates, and thus the holder and the slide shaft rotate synchronously.

5. The rotary tool according to claim 1, wherein a bearing is interposed between the shoulder and the stirring pin.

6. The rotary tool according to claim 1, further comprising:
   a second elastic member that biases the shoulder toward the distal-end side of the stirring pin relative to the axial direction of the rotary shaft.

7. The rotary tool according to claim 1, further comprising:
   a retainer that retains the shoulder in a non-rotating state.

8. The rotary tool according to claim 1, wherein the first elastic member is an elastic member that imparts elastic force by at least one selected from a solid spring, a fluid spring, magnetic force, and electromagnetic force.

9. A joining device including the rotary tool according to claim 1, the joining device comprising:
   a power unit that outputs the rotary force to be transmitted to the rotary shaft of the rotary tool; and
   a position controller that performs position control of the rotary tool by holding the fixed unit of the rotary tool, wherein
   friction stir welding is performed on the joint member by moving the rotary tool to be in a predetermined height position with respect to the joint member by the position controller and inserting the stirring pin into the joint member while pressing the shoulder against the joint member.

10. The joining device according to claim 9, further comprising:
    a second retainer that retains the shoulder in a non-rotating state.

11. A joining method comprising:
    performing friction stir welding on the joint member by moving the rotary tool according to claim 1 to be in a predetermined height position with respect to the joint member and inserting the rotating stirring pin into the joint member while pressing the shoulder against the joint member.

* * * * *